(12) United States Patent
Howard et al.

(10) Patent No.: US 7,946,208 B1
(45) Date of Patent: May 24, 2011

(54) EJECTION SYSTEM FOR DEPLOYING A STORE

(75) Inventors: David G. Howard, Carmel, IN (US); Robert A. Bailey, Avon, IN (US)

(73) Assignee: Raytheon Company, Waltham, MA (US)

( * ) Notice: Subject to any disclaimer, the term of this patent is extended or adjusted under 35 U.S.C. 154(b) by 325 days.

(21) Appl. No.: 12/338,505

(22) Filed: Dec. 18, 2008

Related U.S. Application Data

(60) Provisional application No. 61/014,655, filed on Dec. 18, 2007.

(51) Int. Cl.
 *B64D 1/04* (2006.01)
(52) U.S. Cl. ........................................ 89/1.57; 244/137.4
(58) Field of Classification Search ................ 244/137.1, 244/140, 137.4; 89/1.57, 1.54, 1.58, 1.59; 124/31; 74/2
 See application file for complete search history.

(56) References Cited

U.S. PATENT DOCUMENTS

| | | | | |
|---|---|---|---|---|
| 2,491,400 | A * | 12/1949 | Thumim | 89/1.58 |
| 2,550,380 | A * | 4/1951 | Redford | 244/135 R |
| 2,623,437 | A * | 12/1952 | Foster | 89/1.58 |
| 2,852,299 | A * | 9/1958 | Johnson | 294/82.29 |
| 2,889,746 | A * | 6/1959 | Glassman et al. | 89/1.57 |
| 3,784,132 | A * | 1/1974 | Newell | 244/137.4 |
| 3,799,478 | A * | 3/1974 | Costes et al. | 244/137.4 |
| 3,898,909 | A * | 8/1975 | Craigie | 89/1.57 |
| 4,043,525 | A * | 8/1977 | Jakubowski, Jr. | 244/137.4 |
| 4,049,222 | A * | 9/1977 | Peterson | 244/137.4 |
| 4,095,762 | A * | 6/1978 | Holt | 244/137.4 |
| 4,183,480 | A * | 1/1980 | Jakubowski, Jr. | 244/137.4 |
| 4,313,582 | A * | 2/1982 | Hasquenoph et al. | 244/137.4 |
| 4,347,777 | A * | 9/1982 | Jakubowski et al. | 89/1.58 |
| 4,520,975 | A * | 6/1985 | Blackhurst | 244/137.4 |
| 4,669,356 | A * | 6/1987 | Griffin et al. | 89/1.57 |
| 4,679,751 | A * | 7/1987 | Peterson | 244/137.4 |
| 4,685,377 | A * | 8/1987 | Mace et al. | 89/1.54 |
| 4,829,878 | A * | 5/1989 | Thompson | 89/1.54 |
| 4,850,553 | A * | 7/1989 | Takata et al. | 244/137.4 |
| 5,029,776 | A * | 7/1991 | Jakubowski et al. | 244/137.4 |
| 5,406,876 | A * | 4/1995 | Harless et al. | 89/1.54 |
| 5,448,941 | A * | 9/1995 | Godfrey et al. | 89/1.809 |
| 5,487,322 | A * | 1/1996 | Rhodes | 89/1.56 |
| 5,932,829 | A * | 8/1999 | Jakubowski, Jr. | 89/1.54 |
| 6,035,759 | A * | 3/2000 | Jakubowski et al. | 89/1.54 |
| 6,212,987 | B1 * | 4/2001 | Jakubowski et al. | 89/1.54 |
| 6,634,599 | B2 * | 10/2003 | Griffin | 244/137.4 |
| 6,663,049 | B1 * | 12/2003 | Jakubowski et al. | 244/137.4 |
| 6,676,083 | B1 * | 1/2004 | Foster et al. | 244/137.4 |
| 6,705,571 | B2 * | 3/2004 | Shay et al. | 244/137.1 |
| 6,889,592 | B2 * | 5/2005 | Isker et al. | 89/1.53 |
| 6,892,985 | B2 * | 5/2005 | Jakubowski, Jr. | 244/137.4 |
| 7,007,895 | B2 * | 3/2006 | Jakubowski et al. | 244/137.4 |
| 7,083,148 | B2 * | 8/2006 | Bajuyo et al. | 244/137.4 |
| 7,624,947 | B2 * | 12/2009 | Dortch et al. | 244/137.4 |
| 7,648,104 | B1 * | 1/2010 | Jakubowski et al. | 244/137.4 |
| 7,677,501 | B1 * | 3/2010 | Hundley et al. | 244/137.4 |
| 2004/0108415 | A1 * | 6/2004 | Foster et al. | 244/137.1 |
| 2008/0307952 | A1 * | 12/2008 | Middleton | 89/1.57 |

\* cited by examiner

*Primary Examiner* — Benjamin P Lee
(74) *Attorney, Agent, or Firm* — Baker Botts L.L.P.

(57) ABSTRACT

According to one embodiment, an ejection system for deploying a store includes a first cartridge actuated device coupled to a first release mechanism, a second cartridge actuated device coupled to a second release mechanism, and a controller circuit coupled to the first and second cartridge actuated devices. The first and second release mechanisms are configured to eject the store away from a vehicle. The controller circuit is operable to detonate the second cartridge actuated device at a specified period of time after the first cartridge actuated device is detonated.

24 Claims, 4 Drawing Sheets

EJECTION SYSTEM FOR DEPLOYING A STORE

RELATED APPLICATION

This patent application claims priority from Patent Application Ser. No. 61/014,655, filed Dec. 18, 2007, entitled EJECTION SYSTEM FOR DEPLOYING A STORE.

TECHNICAL FIELD OF THE DISCLOSURE

This disclosure generally relates to ejection systems, and more particularly, to an ejection system for deploying a store.

BACKGROUND OF THE DISCLOSURE

A cartridge actuated device (CAD) generally refers to a device that may be detonated to perform mechanical work, typically for another device. For example, cartridge actuated devices may be used in powder-actuated tools, such as nail guns. Cartridge actuated devices may also be used in military systems to eject missiles, bombs, seats, chaff, or other objects. Cartridge actuated devices comprise explosive material that is detonated to perform the desired work. Accordingly, a relatively small initiation energy may be able to trigger a relatively large amount of energy to perform mechanical work.

SUMMARY OF THE DISCLOSURE

According to one embodiment, an ejection system for deploying a store comprises a first cartridge actuated device coupled to a first release mechanism, a second cartridge actuated device coupled to a second release mechanism, and a controller circuit coupled to the first cartridge actuated device and the second cartridge actuated devices. The first and second release mechanisms are configured to eject the store away from the vehicle. The controller circuit is operable to detonate the first cartridge actuated device and detonate the second cartridge actuated device at a specified period of time after the first cartridge actuated device is detonated.

A potential technical advantage of some embodiments of the invention is the ability to accurately control the pitch at which a store is ejected from a vehicle. Another potential technical advantage of some embodiments of the invention is the reduction of the recoil borne by the vehicle after ejecting a store.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

The reliability of cartridge actuated devices (CADs) used in military applications is important. Cartridges that are initiated by physical impact, such as those used in firearms, are generally not sufficiently reliable. For example, these cartridges may use primary explosives that may detonate prematurely due to their relatively strong sensitivity to heat, mechanical shock, electrical shock, and/or electro-magnetic energy. Exploding foil cartridge actuated devices (EFCADs) may be more reliable. These devices comprise electrical circuitry that modifies a trigger signal into a form suitable for actuating an exploding foil initiator.

Figure 1:
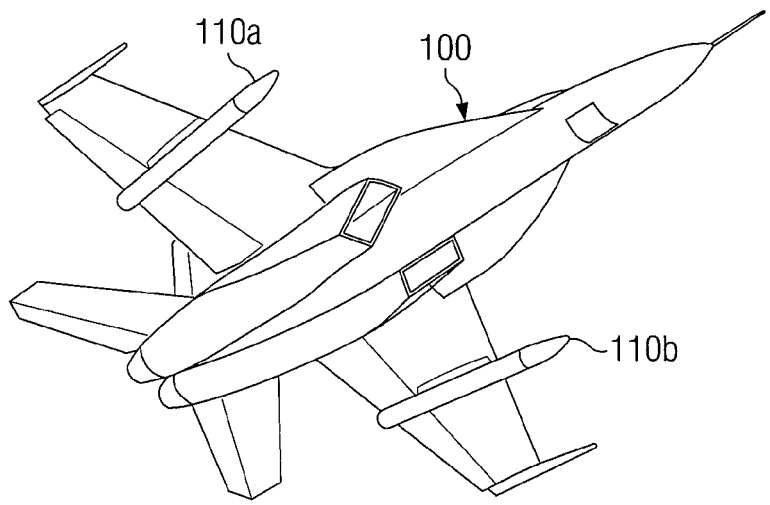
FIG. 1 illustrates the arrangement of the ejection system relative to the vehicle on which it is mounted, in accordance with particular embodiments.

In military applications, cartridge actuated devices are used in ejection systems for deploying a store. FIG. 1 shows one embodiment of a vehicle 100 transporting store ejection systems 110. Vehicle 100 may be any suitable type of vehicle from which stores may be ejected during movement. In one embodiment, vehicle 100 is a military vehicle 100 that is configured to eject stores, such as bombs, missiles, or chaff. On high-speed aircraft, a store ejection system 110 may comprise a cartridge actuated device which may be used to push a store away from the aircraft to avoid turbulence from the aircraft. Turbulence can cause the store to tumble uncontrollably or collide with the aircraft. Though, in FIG. 1, the store ejection systems 110 are arranged parallel to the body of the vehicle 100, the store ejection systems 110 may be arranged in any suitable manner such that stores may be ejected from vehicle 110 in a controlled manner.

Figure 2A:
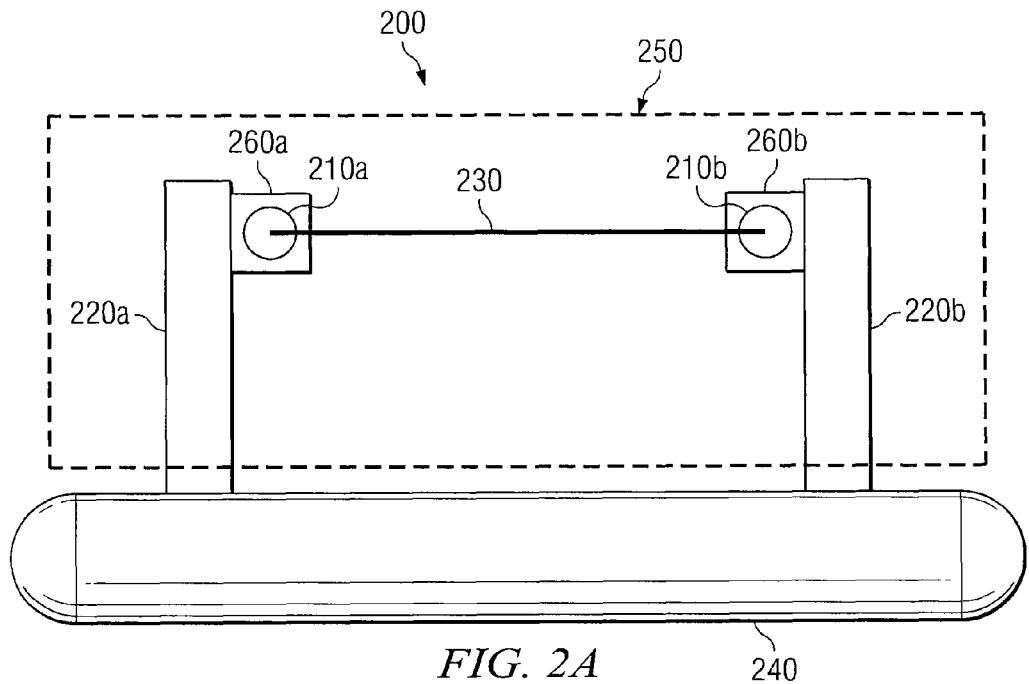
FIGS. 2A-2C illustrate diagrams showing one embodiment of an ejection system for deploying a store according to the teachings of the present disclosure.
Figure 2B:
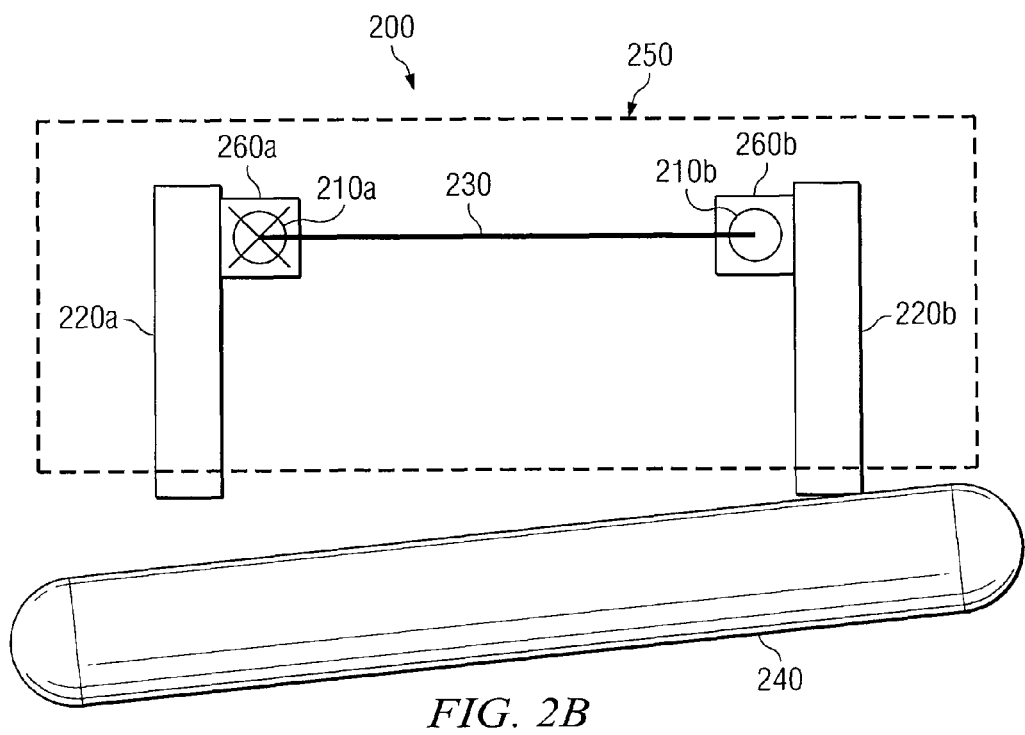
Figure 2C:
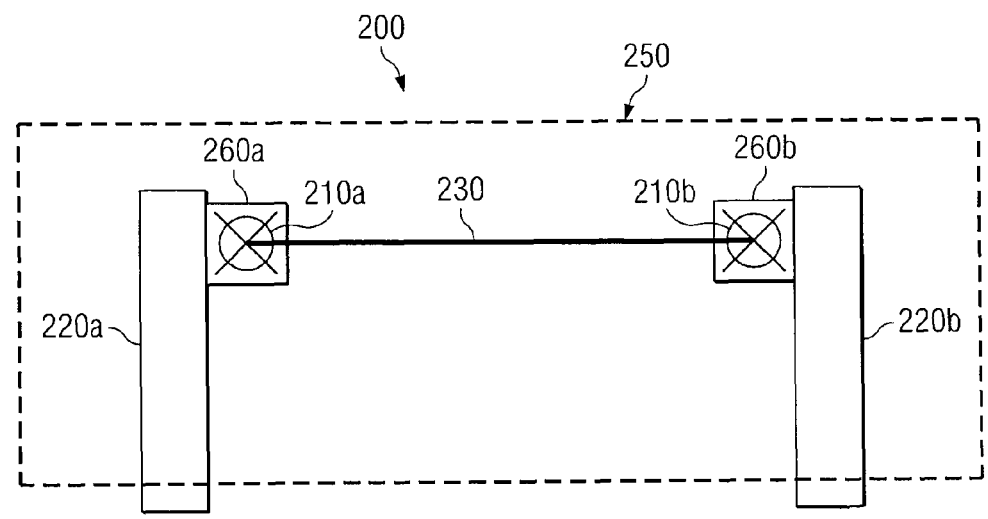

FIGS. 2A-2C shows one embodiment of a store ejection system 200 operable to deploy a store 240. As shown in FIG. 2A, store ejection system 200 generally includes a number of cartridge actuated devices 210 that are each coupled to a release mechanism, which may include a fore ejection piston 220a and an aft ejection piston 220b. Each of the release mechanisms may be actuated upon detonation of the cartridge actuated device to which it is coupled. According to the teachings of the present disclosure, the cartridge actuated devices 210 may be coupled to a controller circuit 230 that is operable to detonate each of the cartridge actuated devices 210 in a sequential order such that the store 240 may be ejected from the vehicle 250 in a controlled manner. For example, controller circuit 230 may detonate the cartridge actuated devices 210 in a sequential order such that a cartridge actuated device 210a is detonated, a specified delay time passes, and a second cartridge actuated device 210b is detonated.

Vehicle 250 may be any suitable type of vehicle from which stores 240 may be ejected during movement. In one embodiment, vehicle 250 is a military vehicle 250 that is configured to eject stores 240, such as bombs, missiles, or chaff. In this particular embodiment, ejection of the store 240 is provided by release mechanisms that include a fore ejection piston 220a and an aft ejection piston 220b; however, the release mechanism may be any suitable device configured to separate the store 240 from the vehicle 250. In one embodiment, cartridge actuated devices 210 may be coupled to their respective release mechanism through a manifold 260.

In one embodiment, cartridge actuated devices 210 are exploding foil cartridge actuated devices (EFCADs). The time at which detonation of exploding foil cartridge actuated devices occur may be controlled to a relatively high degree of precision. For example, exploding foil cartridge actuated devices may be detonated with a timing precision in the 100 nanosecond range. This level of precision may provide enhanced control of the release of the store 240 in some embodiments.

Controller circuit 230 may be any suitable device coupled to cartridge actuated devices 210 and operable to initiate their detonation. In one embodiment, controller circuit 230 may include electronic circuitry that generates electrical pulses suitable for actuating each of the cartridge actuated devices 210.

One aspect of releasing the store 240 is the setting of the pitch or angle at which it leaves the vehicle 250. In certain embodiments, the pitch at which the store 240 is released can be controlled by initiating the cartridge actuated devices 210 at different times.

For example, the store 240 may be designed to be released slightly nose down. As shown in FIG. 2B, fore cartridge actuated device 210a may be detonated before detonation of aft cartridge actuated device 210b. Thus, the fore ejection piston 220a is actuated prior to actuation of the aft ejection piston 220b, and the fore portion of the store 240 falls before the aft portion falls. After the fore cartridge actuated device 210a is detonated, aft cartridge actuated device 210b may be detonated, as shown in FIG. 2C. Detonation of aft cartridge actuated device 210c results in the actuation of aft ejection piston 220b, and the store 240 is fully ejected from the vehicle 250. However, according to the teachings of the present disclosure, detonation of the cartridge actuated devices 210 may be timed, or sequenced, in any order such that one fires slightly before the other to initiate pistons 220 to pitch the store 240 at a desired angle.

The desired angle at which a store is to be released depends on a number of factors, including the type of store 240 to ejected, the type of vehicle 250 from which the store is to be ejected, the altitude of the vehicle 250, and the velocity of the vehicle 250. A suitable delay time between detonation of devices 210 may be used to affect the angle of release. For example, a delay time may be as short as 10 microseconds and may be as large as required in order to properly eject the store. Controller circuit 230 may vary the delay time in order for the store to be ejected at the desired angle. Accordingly, manual adjustments to the bomb rack may not be required.

In certain embodiments of the store ejection system 200, sequencing detonation may reduce the recoil on the vehicle 250. Detonating a single cartridge actuated device with a single sudden burst may cause a shock pulse on the vehicle 250, causing wing flex and dynamic stress in other mounted equipment. Detonating cartridge actuated devices 210 sequentially may reduce recoil on the vehicle 250 and allow for better control of the release velocity.

Figure 3:
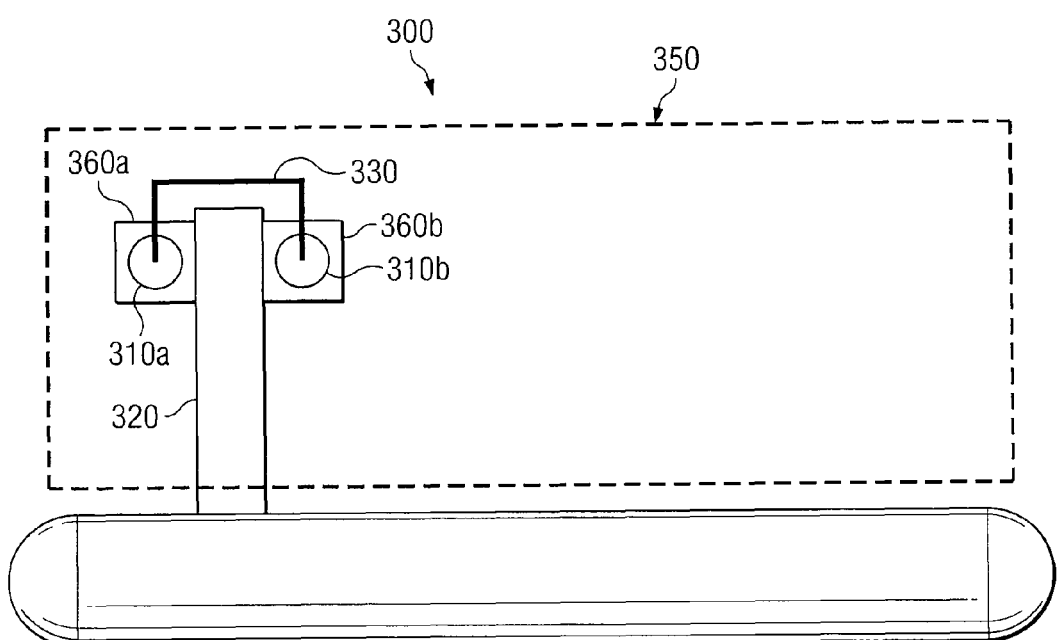
FIG. 3 is a diagram showing a second embodiment of an ejection system for deploying a store according to the teachings of the present disclosure.

FIG. 3 illustrates one embodiment in which only one release mechanism 320 may be used to eject the store 340. In store ejection system 300, the release mechanism 320 may be actuated by the sequential detonation of two or more cartridge actuated devices 310 to which it is coupled in order to reduce the recoil borne by the vehicle 350. According to the teachings of the present disclosure, the cartridge actuated devices 310 may be coupled to a controller circuit 330 that is operable to detonate each of the cartridge actuated devices 310 in a sequential order such that the store 340 may be ejected from the vehicle 350 in a controlled manner. As in FIGS. 2A-2C, a suitable delay time between detonation of cartridge actuation devices 310 may be used to eject the store in a controlled manner.

The two or more cartridge actuated devices 310 may be coupled to the release mechanism 320 in any effective manner. For example, the two or more cartridge actuated devices 310 may be contained within the confines of one cartridge coupled to the release mechanism 320, or, as shown in FIG. 3, the two or more cartridge actuated devices 310 may each be contained within a separate cartridge coupled to the release mechanism 320. Each cartridge actuated device 310 may also be enclosed by a check valve, one-way valve, or any other mechanical device operable to prevent the inward flow of any heat or pressure from the explosion of another cartridge actuated device 310 while allowing for the outward flow of any heat or pressure from the explosion of the cartridge actuated device 310 which it encloses. In some embodiments, the operability of a check valve is provided by a metal cap.

In this particular embodiment, ejection of the store 340 is provided by a release mechanism that comprises an ejection piston 320; however, the release mechanism may be any suitable device configured to separate the store 340 from the vehicle 350. In one embodiment, cartridge actuated devices 310 may be coupled to the release mechanism through manifolds 360.

In the embodiment illustrated in FIG. 3, detonating cartridge actuated devices 310 sequentially may reduce recoil on the vehicle 350 and allow for better control of the release velocity.

Figure 4A:
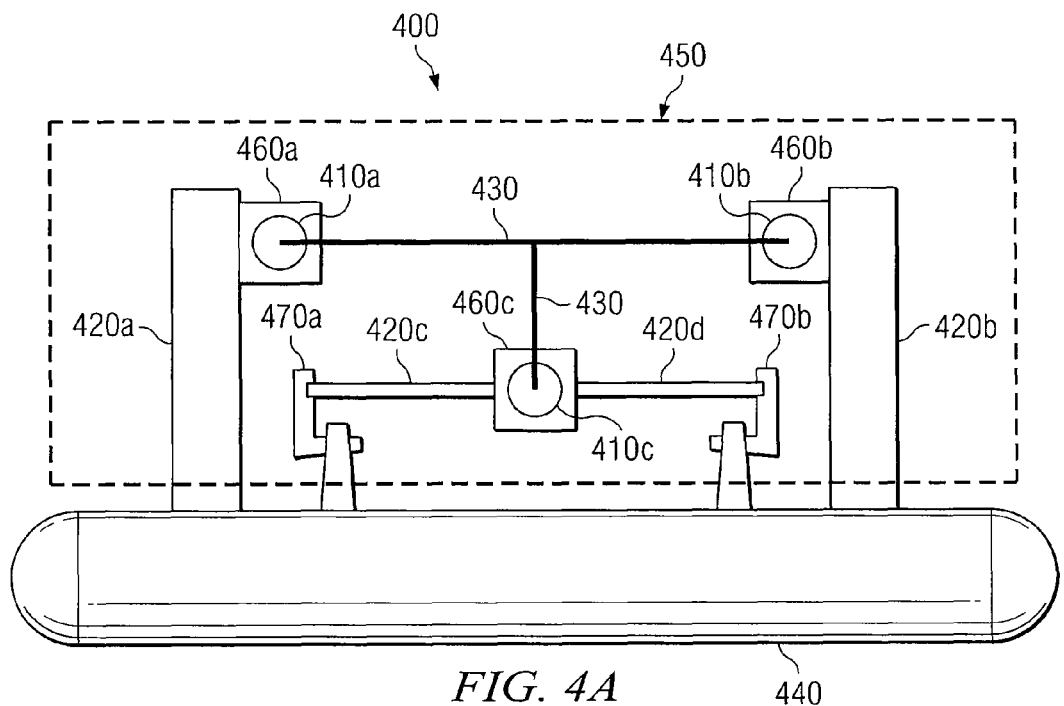
FIGS. 4A-4B illustrate diagrams showing a third embodiment of an ejection system for deploying a store according to the teachings of the present disclosure.
Figure 4B:
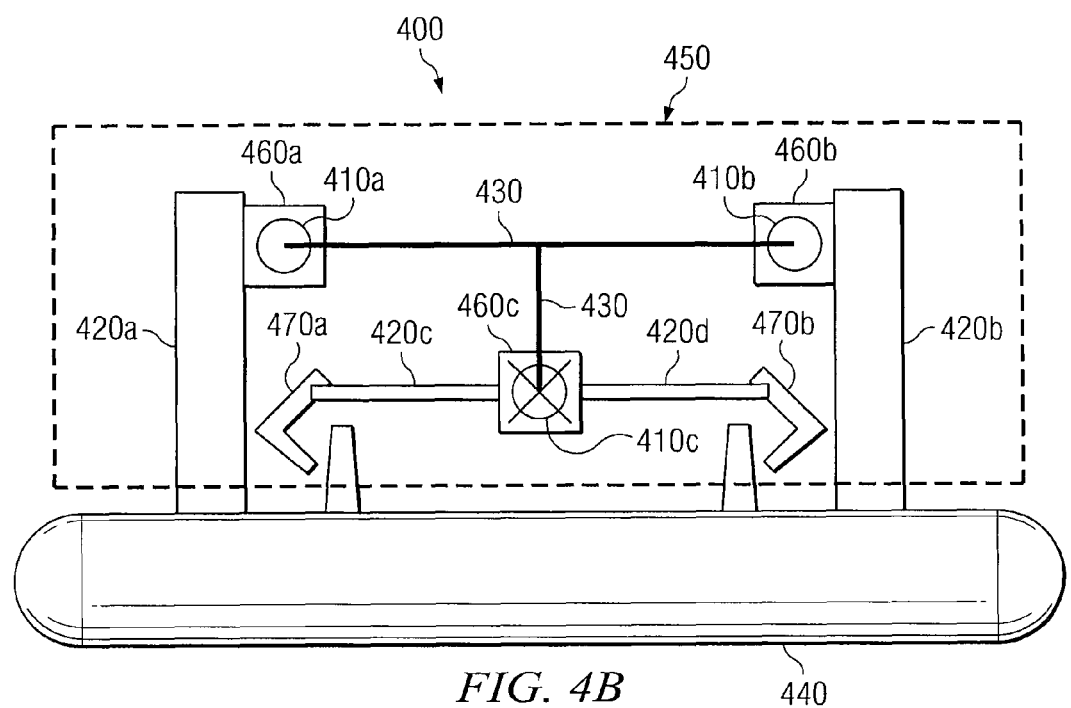

FIGS. 4A-4B show one embodiment of a store ejection system 400 operable to deploy a store 440. As shown in FIG. 4A, store ejection system 400 generally includes a number of cartridge actuated devices 410 that are each coupled to a release mechanism, which may include a fore ejection piston 420a and an aft ejection piston 420b. Additionally, a cartridge actuated device 410c may be coupled to pistons 420c and 420d, each of which is coupled to a release mechanism, which may include a hook 470 configured to hold the store 440 proximate to the vehicle 450. Each of the hooks 470 may be coupled to a corresponding piston 420c and 420d by a mechanical latching mechanism, which may be a spring, over-center draw, or any other device operable to couple the pistons 420c and 420d to the hooks 470 such that the actuation of the pistons 420c and 420d actuates the hook 470 to which they are coupled.

Vehicle 450 may be any suitable type of vehicle from which stores 440 may be ejected during movement. In one embodiment, vehicle 450 is a military vehicle 450 that is configured to eject stores, such as bombs, missiles, or chaff. In this particular embodiment, ejection of the store 440 is provided by release mechanisms that include a fore ejection piston 420a, an aft ejection piston 420b, and hooks 470; however, the release mechanism may be any suitable device configured to separate the store 440 from the vehicle 450. In one embodiment, cartridge actuated devices 410 may be coupled to their respective release mechanism through a manifold 460.

In one embodiment, cartridge actuated devices 410 are exploding foil cartridge actuated devices (EFCADs). The time at which detonation of exploding foil cartridge actuated devices occur may be controlled to a relatively high degree of precision. For example, exploding foil cartridge actuated devices may be detonated with a timing precision in the 100 nanosecond range. This level of precision may provide enhanced control of the release of the store 20 in some embodiments.

Controller circuit 430 may be any suitable device coupled to cartridge actuated devices 410 and operable to initiate their detonation. In one embodiment, controller circuit 430 may include electronic circuitry that generates electrical pulses suitable for actuating each of the cartridge actuated devices 410.

Each of the release mechanisms may be actuated upon detonation of the cartridge actuated device to which it is coupled. For example, the detonation of cartridge actuated device 410c actuates pistons 420c and 420d, which in turn actuate the hooks 470 to which they are coupled. According to the teachings of the present disclosure, the cartridge actuated devices 410 may be coupled to a controller circuit 430 that is operable to detonate each of the cartridge actuated devices 410 in a sequential order such that the store 440 may be ejected from the vehicle 450 in a controlled manner.

Sequenced detonation of the cartridge actuated devices 410 may provide a relatively precise actuation of the bomb rack hooks 470 relative to the ejection pistons 420. Using a single detonation to actuate both ejection pistons 420 and bomb rack hooks 470 may require elaborate linkage designs. In addition, the hooks 470 might not open before the bomb rack pistons 420 start pushing the store 440 away, placing stress on the structure of the vehicle 450. FIG. 4B illustrates an embodiment in which controller circuit 430 may detonate the cartridge actuated devices 410 in a sequential order such that a cartridge actuated device 410c is detonated, a specified delay time passes, and then a second cartridge actuated device 410a is detonated. After a subsequent specified delay time passes, a third cartridge actuated device 410b is detonated. By detonating cartridge actuated device 410c first, the controller circuit 430 ensures that hooks 470 are opened before pistons 420a and 420b start pushing the store away.

As with the embodiment illustrated in FIGS. 2A-2C, the pitch at which the store is released can be controlled by initiating at different times the cartridge actuated devices coupled to pistons 420a and 420b. For example, fore cartridge actuated device 410a may be detonated before detonation of aft cartridge actuated device 410b. Thus, the fore ejection piston 420a is actuated prior to actuation of the aft ejection piston 420b, and the fore portion of the store 440 falls before the aft portion falls. However, according to the teachings of the present disclosure, detonation of the cartridge actuated devices 410 may be timed, or sequenced, in any order such that one fires slightly before the other to initiate pistons 420 to pitch the store 440 at a desired angle. Moreover, as with the embodiment represented by FIGS. 2A-2C, a suitable delay time can be selected to pitch the store 440 at the desired angle. Controller circuit 430 may vary the delay time in order for the store to be ejected at the desired angle. Accordingly, manual adjustments to the bomb rack may not be required.

Figure 5:
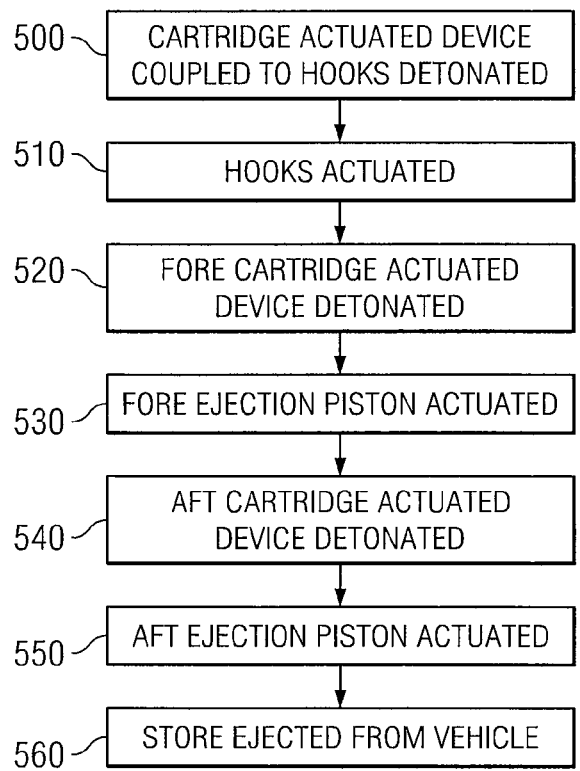
FIG. 5 is a flowchart showing the steps used in deploying a store, in accordance with particular embodiments.

FIG. 5 illustrates one of the many ways multiple cartridge actuated devices may provide relatively precise control over the deployment of a store. In this example, ejection of the store is provided by release mechanisms that include a fore ejection piston, an aft ejection piston, and hooks. Each of the release mechanisms may be actuated upon detonation of the cartridge actuated device to which it is coupled.

The example begins, at step 500, with the detonation of the cartridge actuated device coupled to the hooks. Then, at step 510, the hooks are actuated as a result of the detonation. In one embodiment, the cartridge actuated device may be coupled to two pistons, each of which is coupled to a hook. Each of the hooks may be coupled to its corresponding piston by a mechanical latching mechanism, which may be a spring, over-center draw, or any other device operable to couple the pistons and to the hooks such that the actuation of the pistons actuates the hook to which they are coupled. Thus, in one embodiment, the detonation of the cartridge actuated device actuates each of two pistons, the actuation of which causes the actuation of both hooks.

At step 520, the fore cartridge actuated device is detonated, which results in the actuation of the fore ejection piston at step 530. The actuation of the fore ejection piston causes the fore portion of the store to fall. Then, at step 540, the aft cartridge actuated device is detonated, which results in the actuation of the aft ejection piston at step 550. The actuation of the aft ejection piston causes the aft portion of the store to fall. After actuation of the fore and aft ejection piston, at step 560, the store is ejected from the vehicle.

Thus, according to one embodiment, the hooks are actuated prior to actuation of either of the fore ejection piston or the aft ejection piston, and the actuation of the pistons will not place stress on the structure of the vehicle. Furthermore, the actuation of the fore and aft ejection pistons can be sequenced with an appropriate delay time such that the store is released as the desired pitch.

Although the present disclosure and its advantages have been described in detail, it should be understood that various changes, substitutions, and alterations can be made therein without departing from the spirit and scope of the disclosure as defined by the appended claims.

What is claimed is:

1. An ejection system for deploying a store comprising:
  a first cartridge actuated device coupled to a first release mechanism that is configured to eject the store away from a vehicle;
  a second cartridge actuated device coupled to a second release mechanism that is configured to eject the store away from the vehicle; and
  a controller circuit coupled to the first cartridge actuated device and the second cartridge actuated device and operable to:
    detonate the first cartridge actuated device; and
    detonate the second cartridge actuated device at a specified period of time after the first cartridge actuated device is detonated.

2. The ejection system of claim 1, wherein the vehicle is a military aircraft.

3. The ejection system of claim 1, wherein the store is a bomb.

4. The ejection system of claim 1, wherein the store is a missile.

5. The ejection system of claim 1, wherein the first cartridge actuated device and the second cartridge actuated device are exploding foil cartridge actuated devices.

6. The ejection system of claim 1, wherein the first release mechanism and the second release mechanism are pistons.

7. The ejection system of claim 6, further comprising a third cartridge actuated device coupled to an at least one hook that is configured to hold the store proximate to the vehicle, wherein the controller circuit is further coupled to the third cartridge actuated device and further operable to:
  detonate the third cartridge actuated device; and
  detonate the first cartridge actuated device at a specified period of time after the third cartridge actuated device is detonated.

8. The ejection system of claim 1, wherein the first release mechanism is a piston and the second release mechanism is a hook.

9. The ejection system of claim 1, wherein the controller circuit is further operable to:
  detonate the second cartridge actuated device at a variety of specified times after the first cartridge actuated device is detonated.

10. The ejection system of claim 1, wherein the first release mechanism and the second release mechanism are the same.

11. The ejection system of claim 10, wherein the first cartridge actuated device and the second cartridge actuated device are contained within a cartridge.

12. The ejection system of claim 10, wherein the first cartridge actuated device is contained within a first cartridge and the second cartridge actuated device is contained within a second cartridge.

13. A method for deploying a store comprising:
  detonating a first cartridge actuated device coupled to a first release mechanism that is configured to eject the store away from a vehicle; and
  detonating, at a specified period of time after the first cartridge actuated device is detonated, a second cartridge actuated device coupled to a second release mechanism that is configured to eject the store away from the vehicle.

14. The method of claim 13, wherein the vehicle is a military aircraft.

15. The method of claim 13, wherein the store is a bomb.

16. The method of claim 13, wherein the store is a missile.

17. The method of claim 13, wherein the first cartridge actuated device and the second cartridge actuated device are exploding foil cartridge actuated devices.

18. The method of claim 13, wherein the first release mechanism and the second release mechanism are pistons.

19. The method of claim 18, further comprising:
  detonating a third cartridge actuated device coupled to an at least one hook that is configured to hold the store proximate to the vehicle; and
  detonating the first cartridge actuated device at a specified period of time after the third cartridge actuated device is detonated.

20. The method of claim 13, wherein the first release mechanism is a piston and the second release mechanism is a hook.

21. The method of claim 13, further comprising:
  detonating the second cartridge actuated device at a variety of specified times after the first cartridge actuated device is detonated.

22. The method of claim 13, wherein the first release mechanism and the second release mechanism are the same.

23. The method of claim 22, wherein the first cartridge actuated device and the second cartridge actuated device are contained within a cartridge.

24. The method of claim 22, wherein the first cartridge actuated device is contained within a first cartridge and the second cartridge actuated device is contained within a second cartridge.

* * * * *